US012795272B1

(12) United States Patent
Jia et al.

(10) Patent No.: US 12,795,272 B1
(45) Date of Patent: Nov. 10, 2026

(54) SYSTEMS AND METHODS FOR COHERENT OPTICAL BACKHAULING

(71) Applicant: CABLE TELEVISION LABORATORIES, INC., Louisville, CO (US)

(72) Inventors: Zhensheng Jia, Superior, CO (US); Mu Xu, Shoreline, WA (US); Luis Alberto Campos, Superior, CO (US); Curtis Dean Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 295 days.

(21) Appl. No.: 18/767,919

(22) Filed: Jul. 9, 2024

Related U.S. Application Data

(62) Division of application No. 17/503,643, filed on Oct. 18, 2021, now Pat. No. 12,035,083.

(60) Provisional application No. 63/092,785, filed on Oct. 16, 2020.

(51) Int. Cl.

| | |
|---|---|
| ***H04Q 11/00*** | (2006.01) |
| ***H04B 10/40*** | (2013.01) |
| *H04B 10/61* | (2013.01) |
| *H04B 10/66* | (2013.01) |

(52) U.S. Cl.
CPC ......... *H04Q 11/0062* (2013.01); *H04B 10/40* (2013.01); *H04B 10/61* (2013.01); *H04B 10/66* (2013.01); *H04Q 2011/0064* (2013.01)

(58) Field of Classification Search
CPC ........ H04Q 11/0062; H04Q 2011/0064; H04B 10/40; H04B 10/61; H04B 10/66
See application file for complete search history.

(56) References Cited

U.S. PATENT DOCUMENTS

2013/0044766 A1* 2/2013 Pantelias ............. H04L 12/2801 370/468
2016/0380698 A1* 12/2016 Elahmadi ................. G02B 6/00 398/135
2018/0316436 A1* 11/2018 Gao ........................ H04B 10/27
2018/0316992 A1* 11/2018 Zheng ..................... H04B 10/25
2019/0245619 A1* 8/2019 Campos ............... H04B 10/272
2020/0280372 A1* 9/2020 Li ......................... H01S 5/0085

* cited by examiner

*Primary Examiner* — Pranesh K Barua
(74) *Attorney, Agent, or Firm* — Lathrop GPM LLP

(57) ABSTRACT

An integrated transceiver is provided for a coherent optical communication network. The integrated transceiver includes a first optical transceiver portion configured to receive and transmit coherent optical signals from and to the coherent optical communication network, respectively. The integrated transceiver further includes a second optical transceiver portion configured to receive and transmit non-coherent optical signals respectively from and to a non-coherent optical communication network. The integrated transceiver further includes an integrated media access control (MAC) processor disposed between the first and second optical transceiver portions. A method for backhauling traffic from a coherent optical communication network to a non-coherent optical communication network is provided. The method is implemented using an integrated transceiver including a coherent optical receiver portion and a non-coherent optical transmitter portion in communication with the coherent optical transmitter portion.

20 Claims, 8 Drawing Sheets

SYSTEMS AND METHODS FOR COHERENT OPTICAL BACKHAULING

CROSS REFERENCE TO RELATED APPLICATIONS

This application is a divisional application of U.S. patent application Ser. No. 17/503,643, filed Oct. 18, 2021, which application claims the benefit of and priority to U.S. Provisional Patent Application Ser. No. 63/092,785, filed Oct. 16, 2020. These prior filed applications are incorporated herein by reference in their entirety.

FIELD

The field of the disclosure relates generally to communication networks, and more particularly, to optical communication networks employing backhauling technologies.

BACKGROUND

Conventional access networks, and particularly within the cable operator paradigm, are presently undergoing a fundamental shift; operations that have been traditionally centralized at the hub or headend are now being relocated into distributed architectures. That is, typical hub/headend functionality is now beginning to reside closer to subscriber terminal end user devices, such as in intelligent fiber nodes between the hub/headend and the end users. These distributed architectures have helped to relieve space, hardware, and power constraints at the hub/headend; however, decentralizing the control raises particular challenges to network operators supporting multiple services on a common transport platform, as described further below with respect to FIG. 1.

FIG. 1 is a schematic illustration of a conventional optical communication network architecture 100, which is capable of supporting multiple services. In the example depicted in FIG. 1, architecture 100 is illustrated as a converged cable access platform (CCAP) network, and represents an aggregation use case of an optical access network including a hub/headend 102, an aggregation node 104, and a plurality of end users 106 utilizing various different respective services (e.g., homes/residences, mobile x-hauling, businesses or enterprise connections, etc.).

Hub/headend 102 and aggregation node 104 are communicatively coupled by a first optical fiber 108 (sometimes referred to as "long fiber"), and aggregation node 104 communicates with respective end users 106 over one or more second optical fibers 110 (sometimes referred to as "short fibers"). In this conventional example, end users 106 (1-3) are depicted as residences, which receive digital optical signals from respective second optical fibers 108 by way of a remote physical layer (PHY) device (RPD) 112 (e.g., end user 106(1)) and/or a remote media access control (MAC) and PHY device (remote MAC-PHY device, or RMD) 114 (e.g., end user 106(2)) communicating with the end user subscribers over cables 116, and/or by way of a remote optical line terminal (OLT) 118 (e.g., end user 106(3), in a fiber-to-the-premises (FTTP) configuration).

Architecture 100 thus depicts a common transport platform operating over a typical point-to-multipoint (P2MP) topology, which is also referred to a tree or trunk-and-branch topology. Such conventional network topologies utilize digital optical technology to split the downlink (DL) hub signals by either an active optical network (AON) topology, or a passive optical network (PON) technology. The following description primarily follows the PON example; however, the person of ordinary skill in the art will understand that such is for ease of explanation, and is not intended to be limiting.

For example, in the AON approach, hub/headend 102 transmits a single 100 or 200 Gbps coherent optical signal to aggregation node 104 (at a distance of up to 80 km for first optical fiber 108). Aggregation node 104 terminates the optical link from hub/headend 102, and then generates multiple 10 Gbps links to respective end users 106 using low cost grey optics that may only need to span a few kilometers (i.e., the length of second fibers 110). In this example, aggregation node 104 would include one of several different types of electrically powered network devices, such as a router, switch, or muxponders. In contrast, the PON approach uses optical splitters, which require no electrical power in aggregation node 104 to transmit signal to the respective child nodes.

Architecture 100 thus illustrates a distributed network topology that simultaneously supports multiple services to pluralities of different types of end users 106 using RPD 112, RMD 114, and/or a remote PON (e.g., OLT 118), as well as more direct services such as mobile x-haul (e.g., end user 106(4)) and business/enterprise connectivity (e.g., end user 106(5)). However, because this conventional system requires different schedulers for each of the respective multiple services, the distributed topology thereof introduces significant latency into the multiple separately-scheduled signals.

Architecture 100 further illustrates another significant recent change to the optical access network, namely, how analog optical networks traditionally found between the hub and fiber node are now being replaced with digital optics to improve the signal to noise ratio (SNR). However, with this improvement to the access network hardware, the count of optical endpoints has also grown exponentially, and with fewer subscriber end users for each such optical endpoint, to meet the bandwidth demand for more service groups. There is thus a significant desire in the field for increased and improved optical backhauling to aggregate optical links from each downstream (or "child") node and enable the transport connection to the hub or headend.

Accordingly, since optical backhauling capacity is driven both by this ever-increasing residential data service tier growth rate, and also by the increasing number of services types supported by the network (e.g., business, mobile x-haul, various FTTP PONs, etc.), there is a further need in the industry to both integrate and coordinate the multiple different services among the plurality of optical endpoints to reduce the latency, costs, and footprint of the network.

SUMMARY

In an embodiment, an integrated transceiver is provided for a coherent optical communication network. The integrated transceiver includes a first optical transceiver portion configured to receive and transmit coherent optical signals from and to the coherent optical communication network, respectively. The integrated transceiver further includes a second optical transceiver portion configured to receive and transmit non-coherent optical signals respectively from and to a non-coherent optical communication network. The integrated transceiver further includes an integrated media access control (MAC) processor disposed between the first and second optical transceiver portions. The integrated MAC processor is configured to (i) exchange cooperative scheduling information from the first optical transceiver portion to the second optical transceiver portion, and (ii) enable the first optical transceiver portion to schedule data traffic between the coherent and non-coherent optical communication networks using scheduling information obtained from a control plane of the second optical transceiver portion.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
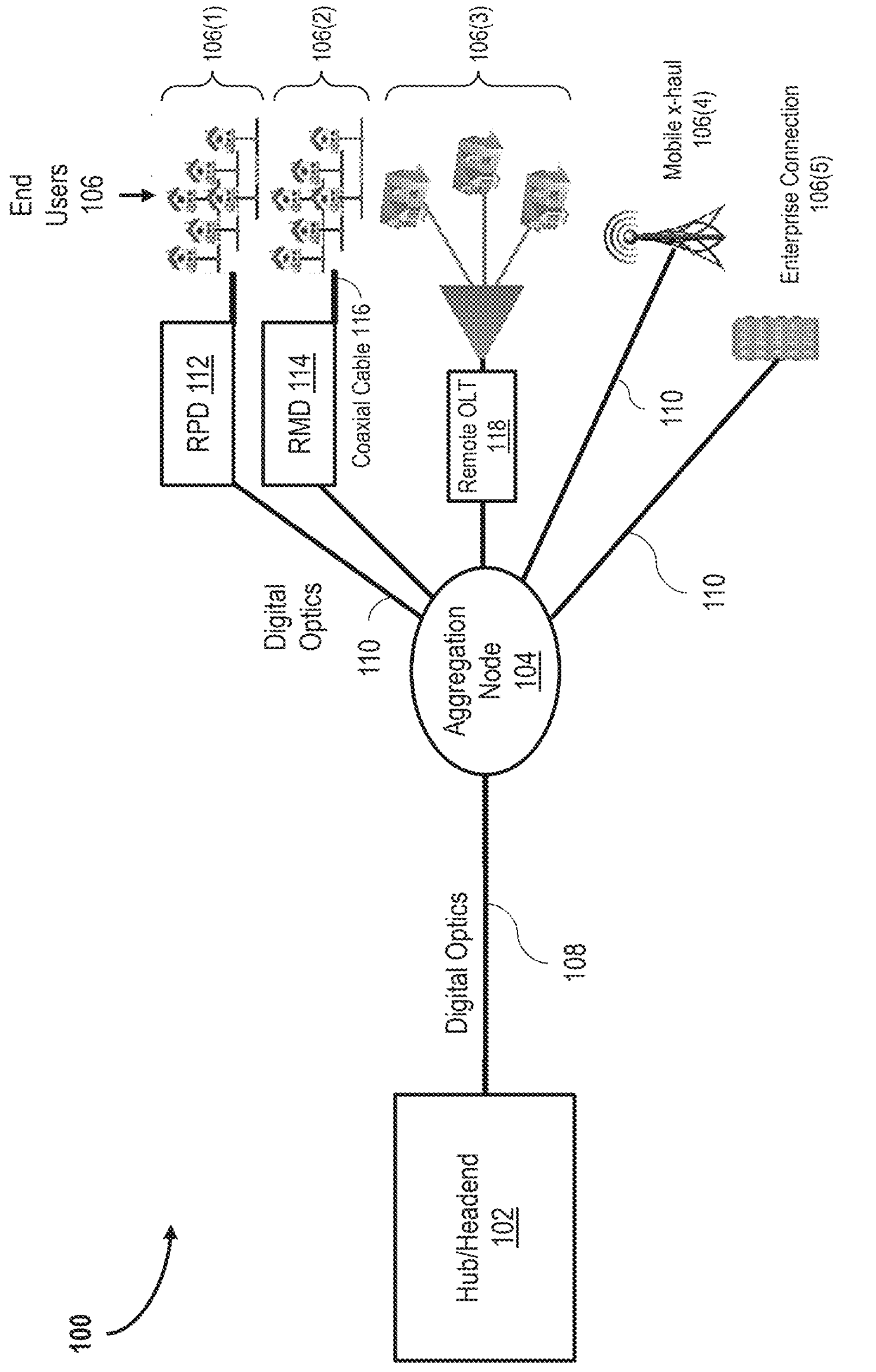
FIG. 1 (Prior Art)
FIG. 1 is a schematic illustration of a conventional optical communication network architecture capable of supporting multiple services.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, unless specified to the contrary, "modem termination system," or "MTS"" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Several embodiments are described herein with respect to various components that may be found in conventional cable, wireless/Wi-Fi, and/or optical networks, which may include, without limitation, an Optical Network Terminal (ONT) or Optical Line Termination (OLT), and an Optical Network Unit (ONU), and may utilize optical protocols such as DOCSIS, EPON, RFOG, GPON, and/or Satellite Internet Protocol, without departing from the scope of the embodiments herein.

Communication systems according to the present embodiments may be further configured for x-hauling traffic, satellite operator communications, MIMO communications, microwave communications, and both short- and long-haul coherent optical communications. As used herein, "X-hauling" refers to any one of or a combination of front-hauling, backhauling, and mid-hauling.

With respect to the embodiments herein, an optical hub or headend may include at least one modem termination system (MTS), which may include, without limitation, a termination unit such as an ONT, an OLT, a Network Termination Unit, a Satellite Termination Unit, a Cable MTS (CMTS), or another similarly-capable termination unit or system. For ease of explanation, all such termination systems/units are collectively referred to herein by the designation "MTS."

As used herein, the term "modem" similarly may include, without limitation, a cable modem (CM), a satellite modem, an ONU, a DSL unit, etc., which are collectively referred to herein as "modems." Furthermore, the protocol may be substituted with, or further include protocols such as EPON, The embodiments described herein provide innovative systems and methods for integrated termination solutions at downstream communication nodes in coherent optical networks. The present techniques are further advantageously applicable to a number of different architectural configurations and different use cases.

According to the systems and methods described herein, coherent optics technology is leveraged to significantly meet the increasing demand for capacity in the CCAP network paradigm, and particularly with respect to the residential data service tier, thereby providing an improved alternative solution for long-term fiber access connectivity between the hub/headend and the aggregation node. The present embodiments further improve upon existing distributed network topologies by enabling the distributed optical endpoints to intelligently operate as integrated controllers, similar to the capability of the hub controller in the centralized architecture, but effectively for multiple different services (e.g., business, mobile x-haul, various FTTP PONs, etc.) available to the distributed architecture. An example of such an improved distributed architecture topology is described further below with respect to FIG. 2.

Figure 2:
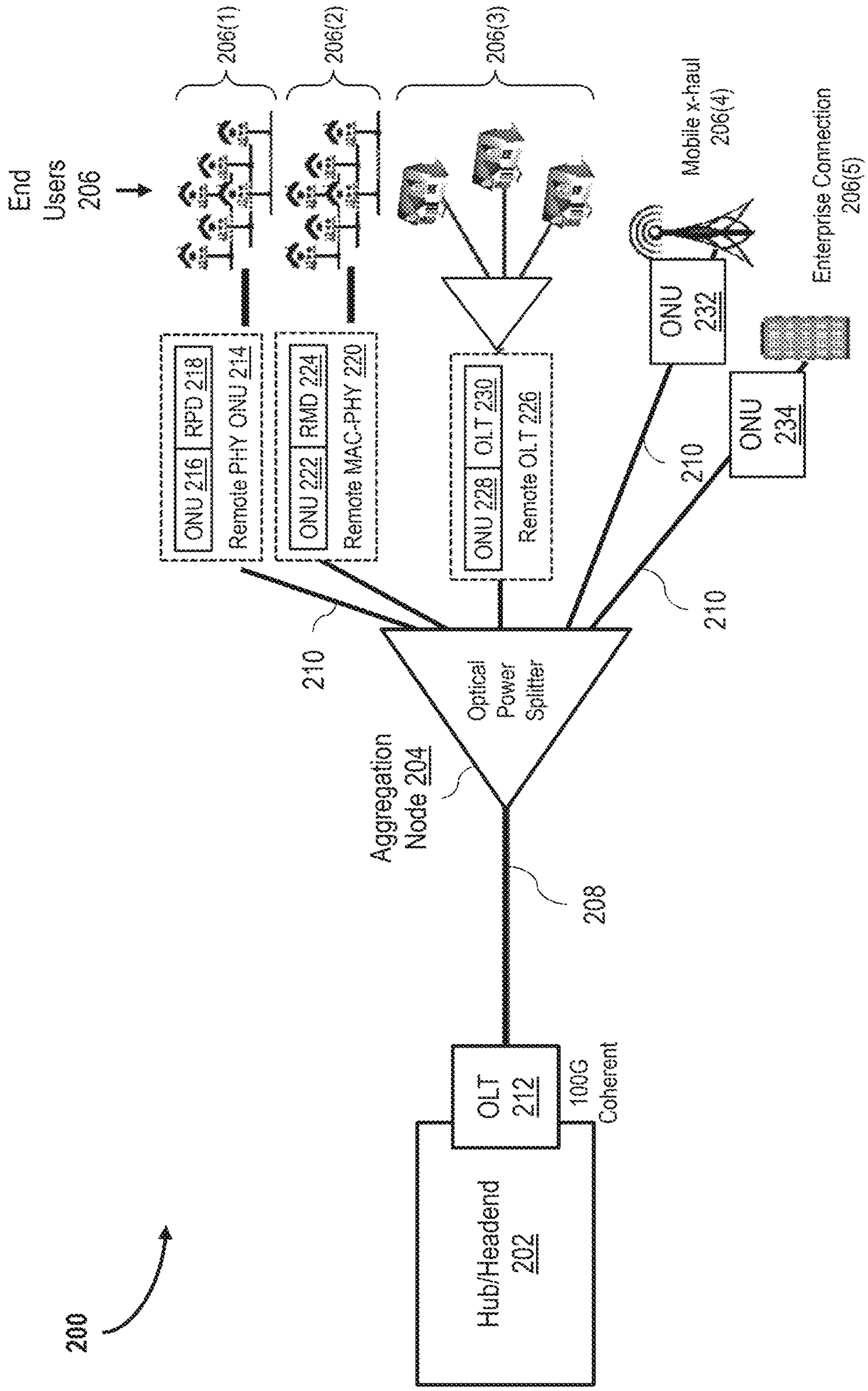
FIG. 2 is a schematic illustration of an exemplary coherent optical communication network for universal aggregation services, in accordance with an embodiment.

FIG. 2 is a schematic illustration of an exemplary coherent optical communication network 200 for universal aggregation services. In the exemplary embodiment depicted in FIG. 2, network 200 is similar to architecture 100, FIG. 1, in a number of aspects, and therefore similar components are referenced by the same respective labels. For example, network 200 similarly includes a hub/headend 202, an aggregation node 204, and a plurality of end users 206 in operable communication over a first optical communication medium 208 (e.g., long fiber from hub-to-node) and a plurality of second optical media 210 (e.g., short fibers from node-to-optical-endpoints).

In this example, hub/headend 202 is illustrated to include a central OLT 212 (e.g., a 100G coherent OLT), and aggregation node 204 is depicted as an optical power splitter. Accordingly, in an exemplary embodiment, implementation of an optical power splitter at aggregation node 204 enables wavelength-independent operation. In some cases, the optical power splitter may be cascaded among several devices (e.g., ×2, ×5, etc.).

In the exemplary embodiment, network 200 is further depicted, for simplicity of explanation, according to the PON topology approach. That is, the innovative principles herein are more readily apparent from an exemplary PON architecture, given its greater operational simplicity, network reliability, scalability for future capacity demand, and statistical gain per child node in comparison with the AON topology. In an exemplary embodiment, network 200 may further utilize a coherent PON (CPON) architecture, which particularly realizes an ultra-high data rate per wavelength, and over a much longer transmission distance with much higher split ratio (e.g., 1:32, or 1:4 followed by 1:8, etc.).

Network 200 differs though, from architecture 100, in that network includes an integrated ONU termination solution at each child node. For example, instead of RPD 112, network 200 may include an integrated RPD-ONU 214 having an ONU portion 216 and an RPD portion 218 which coordinate for communication with end users 206(1). Similarly, instead of RMD 114, network 200 may include an integrated RMD-ONU 220 having an ONU portion 222 and an RMD portion 224 which coordinate for communication with end users 206(2), and instead of remote OLT 118, an integrated remote OLT-ONU 226 having an ONU portion 228 and an OLT portion 230 which coordinate for communication with end users 206(3). Likewise, network 200 further may include one or more of an integrated x-haul ONU 232 (e.g., for end user(s) 206(4)), and an integrated enterprise ONU 234 (e.g., end user(s) 206(5)).

Thus, similar to other PON architectures (e.g., end users 106(3) and architecture 100, FIG. 1), the CPON architecture of network 200 includes a central OLT 212 in hub/headend 202 for communication with the respective CPON ONUs that connected to the multiple different edge devices for the different respective use cases. Different though, from conventional CPONs, the improved topology of network 200 implements innovative integrated ONU terminations (e.g., integrated ONUs 214, 220, 226, 232, 234) for each respective edge service use case.

Exemplary architectures of coherent hub-to-node networks and systems are described in greater detail in U.S. Pat. No. 10,200,123, the disclosure of which is incorporated by reference herein. Additionally, the person of ordinary skill in the art will understand that network 200 is simplified for ease of explanation, does not necessarily illustrate all components that may be implemented within a hub and/or fiber node.

As described further below with respect to FIGS. 3-8, the integrated solutions of the present embodiments significantly reduces the power and space requirements needed for the remote hardware distribution footprint (sometimes referred to as "the clamshell"), while also reducing both the hardware and operational costs to achieve at least the same level of functionality. The integrated solutions herein though, yield further operational improvements for low-latency service offerings through the innovative coordinated and cooperative operation between different schedulers. The following embodiments are described, by way of example and not in a limiting sense, with respect to use cases for distributed CCAP architecture (DCA) topologies and remote PONs.

Figure 3:
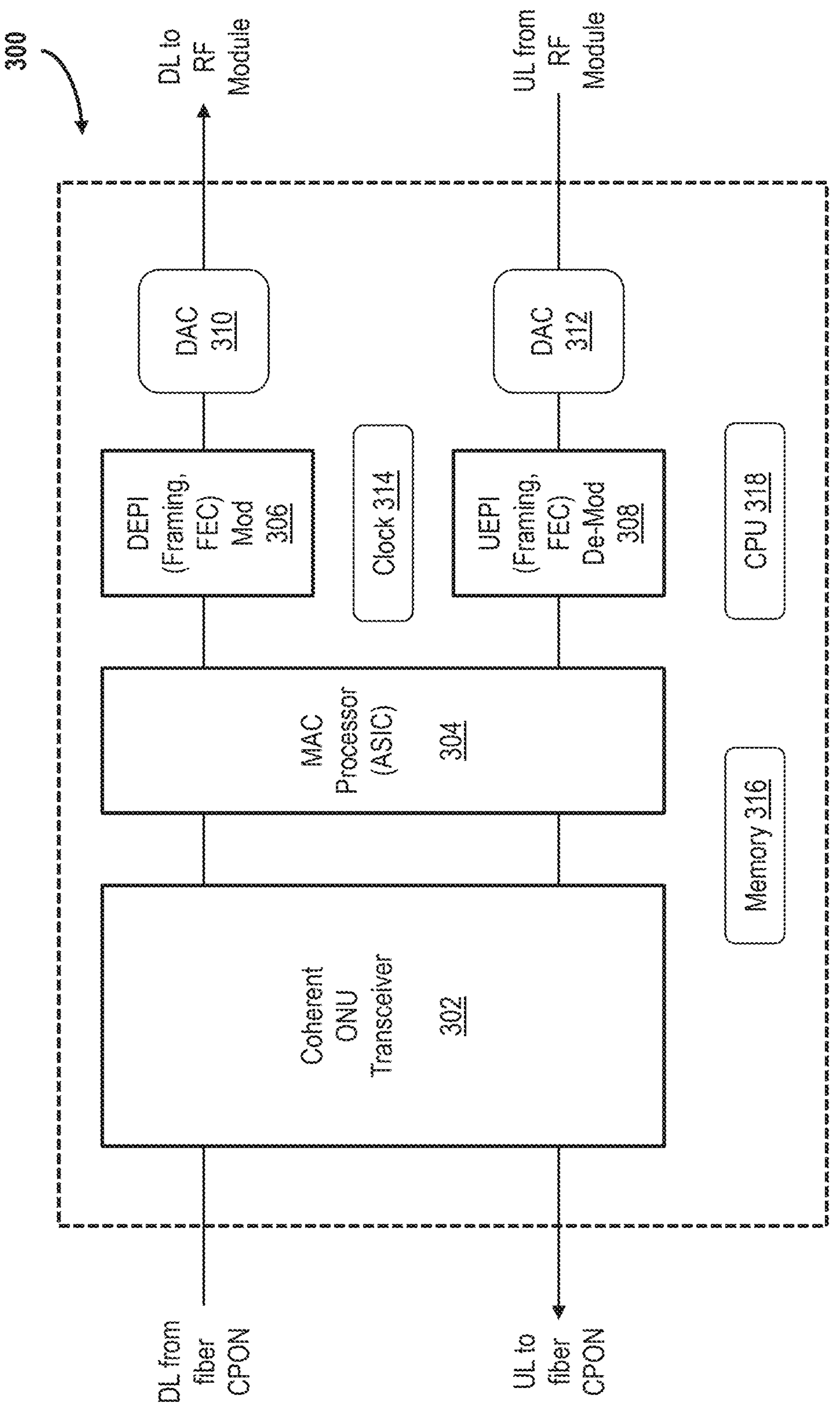
FIG. 3 is a schematic illustration of an exemplary integrated optical network unit, in accordance with an embodiment.

FIG. 3 is a schematic illustration of an exemplary integrated ONU 300. Integrated ONU 300 is similar in many aspects to integrated RPD-ONU 214, FIG. 2, and is representative of a CPON ONU-plus-RPD module in the remote PHY DCA use case. In an exemplary embodiment, integrated ONU 300 integrates a CPON ONU coherent transceiver 302, by way of a MAC processor 304, which is in turn in operable communication with a downstream external PHY interface (DEPI) modulator 306 and an upstream external PHY interface (UEPI) demodulator 308. In an exemplary embodiment, MAC processor 304 is an application specific integrated circuit (ASIC).

In an embodiment, DEPI modulator 306 performs framing and forward error correction (FEC) on the DL signal from MAC processor 304, and UEPI demodulator 308 performs framing and FEC on the UL signal to MAC processor 304. In this exemplary remote PHY use case, the modulated DL signal from DEPI modulator 306 is passed through a digital-to-analog converter (DAC) 310 prior to transport to the RF module in communication with the respective cable RF-based end user (e.g., end user 206(1)). In a similar manner, analog cable RF UL signals from respective end users are converted by an analog-to-digital converter (ADC) 312 before reception and digital demodulation by UEPI demodulator 308.

In exemplary downstream operation of integrated ONU 300, optical signal packet traffic arrives from the CCAP Core and CPON OLT (e.g., central OLT 212, FIG. 2), through the fiber CPON infrastructure (e.g., from second optical communication medium 210, FIG. 2), at a receiver portion (not separately shown) of coherent ONU transceiver 302, followed by the MAC layer of MAC processor 304. In further exemplary operation, DEPI modulator 306 functions to (i) terminate DEPI framing, (ii) extract the payload from the terminated signal, (iii) modulate and/or perform FEC on the extracted payload, and (iv) transmit the modulated/corrected signal, after conversion by DAC 310, out to the RF module. In the case where the RF module is disposed within the cable paradigm, an analog RF signal and the RF module may be further transmitted by way of a cable interface to the respective receiving devices of end users 206(1) (e.g., cable modems).

In exemplary upstream operation of integrated ONU 300, UL RF signals are received from the RF module of the coaxial network (e.g., in the cable paradigm) at ADC 312, which digitizes the received analog RF signals. UEPI demodulator 308 then (i) demodulates the digitized signals, (ii) extracts frames from the FEC payload (e.g., DOCSIS frames, in this example), and (iii) encapsulates the extracted DOCSIS frames into UEPI framing for reception by MAC processor 304. The framed and processed UL signals may then be transmitted to the fiber CPON and the CCAP Core from an upstream burst transmitter portion (not separately shown) of coherent ONU transceiver 302.

In the exemplary embodiment, integrated ONU 300 further includes a local clock unit 314, a local memory 316, and a local central processing unit (CPU) 318, all of which may thus be commonly shared between the ONU portion (e.g., coherent ONU transceiver 302) and the RPD portion (e.g., DEPI modulator 306, UEPI demodulator 308) control planes for integrated and coordinated operation therebetween. More particularly, according to the present integrated ONU configuration, clocking and timing information needed for RPD operation and scheduling by local clock unit 314 may be extracted from the ONU signals from coherent ONU transceiver 302. Additionally, local CPU 318 may then be used within the RPD control planes (e.g., by DEPI modulator 306, UEPI demodulator 308), and local memory 316 advantageously functions to perform buffering for upstream signals processed through integrated ONU 300.

According to the innovative architectural configuration and functional operation of integrated ONU 300, by combining ONU and RPD functionality within a single, intelligent, integrated device, integrated ONU 300 is advantageously enabled to significantly reduce latency, in comparison with conventional techniques that require separate ONUs and RPDs. That is, integrated ONU 300 does not merely combine ONU elements with RPD elements in a single device to conserve space; indeed, through the coordinated operation of shared local clock unit 314, local memory 316, and local CPU 318, integrated ONU 300 intelligently integrates and coordinates ONU operation with RPD operation.

More particularly, according to this innovative embodiment, intelligent integration is achieved by providing coherent ONU transceiver 302 with knowledge of RPD operation of DEPI 306, UEPI 308, and vice versa. RPD scheduling may thus be effectively coordinated, through this shared intelligence between the integrated components, in a manner comparable to that realized by a centralized, less distributed network architecture, thereby significantly reducing the latency challenges experienced by conventional distributed architectures.

Additionally, by sharing several common local components (e.g., local clock unit 314, local memory 316, local CPU 318) between the respective ONU and RPD portions, integrated ONU 300 further reduces not only the footprint of having the ONU separate from the RPD, but also the overall hardware cost thereof. That is, redundant electronic elements are no longer needed in this innovative integrated design. Similar advantages are achieved in the RMD use case, as described further below with respect to FIG. 4.

Figure 4:
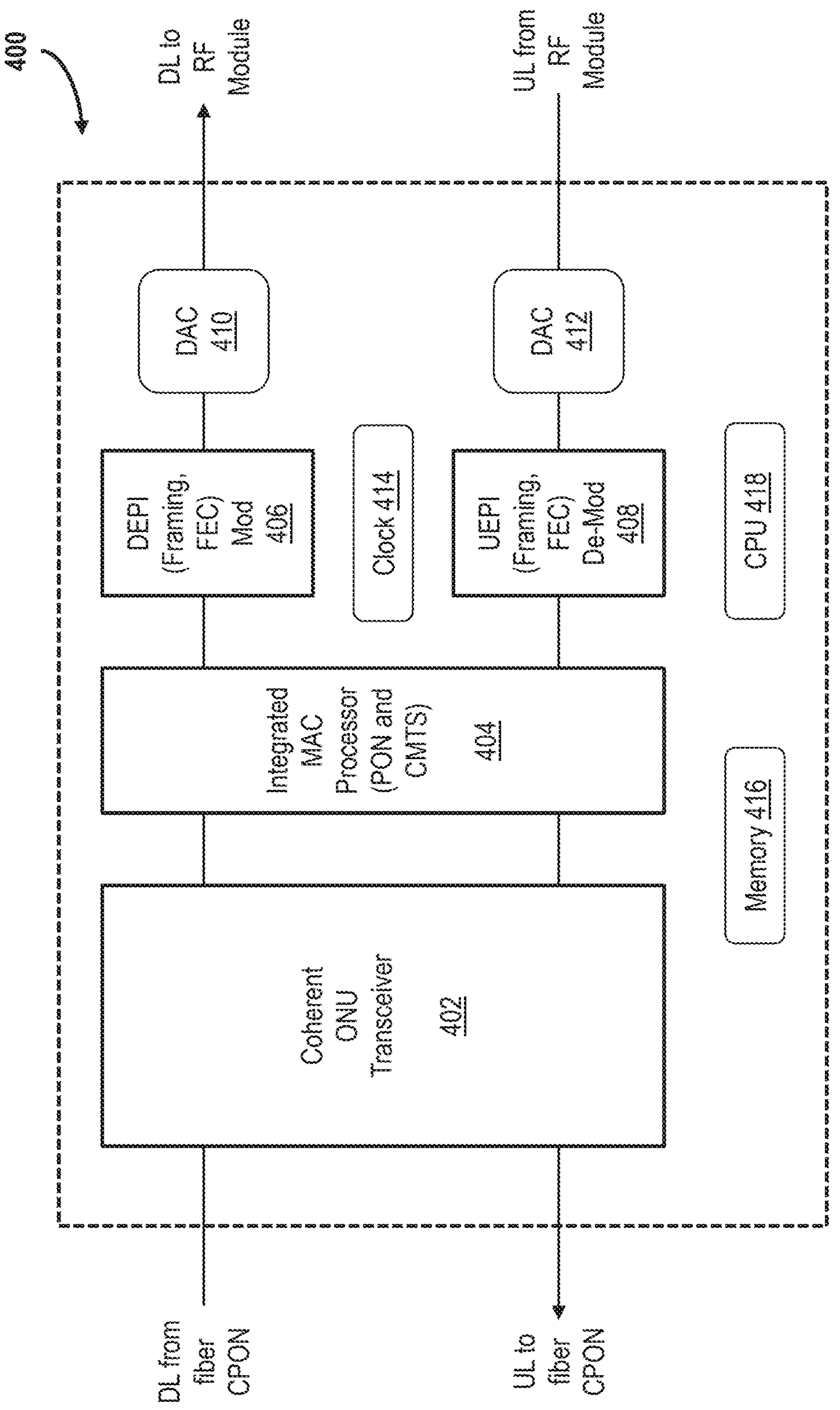
FIG. 4 is a schematic illustration of an alternative integrated optical network unit, in accordance with an embodiment.

FIG. 4 is a schematic illustration of an alternative integrated ONU 400. That is, integrated ONU 400 is similar in many aspects to integrated ONU 300, FIG. 3, but represents an alternative CPON ONU-plus-RMD module in the remote PHY DCA use case, for example, similar to integrated RMD-ONU 220, FIG. 2. Similar to integrated ONU 300 integrated ONU 400 includes an ONU coherent transceiver 402, and a MAC processor 404 in operable communication with a DEPI modulator 406 and a UEPI demodulator 408. Also similar to integrated ONU 300, integrated ONU 400 further includes a DAC 410, an ADC 412, a shared local clock unit 414, a shared local memory 416, and a shared local CPU 418.

In the exemplary embodiment depicted in FIG. 4 though, integrated ONU 400 differs from integrated ONU 300, in that MAC processor 404 is integrated to include both of a PON scheduler and an MTS/CMTS scheduler on the same chip. In exemplary operation of integrated ONU 400 is otherwise similar to that described above with respect to integrated ONU 300. It may be noted though, that in comparison with integrated ONU 300, integrated ONU 400 may utilize lower speed DCA interfaces to enable higher-speed CPON ONU connection through respective data rate mapping and conversion functions of the several components thereof.

Figure 5:
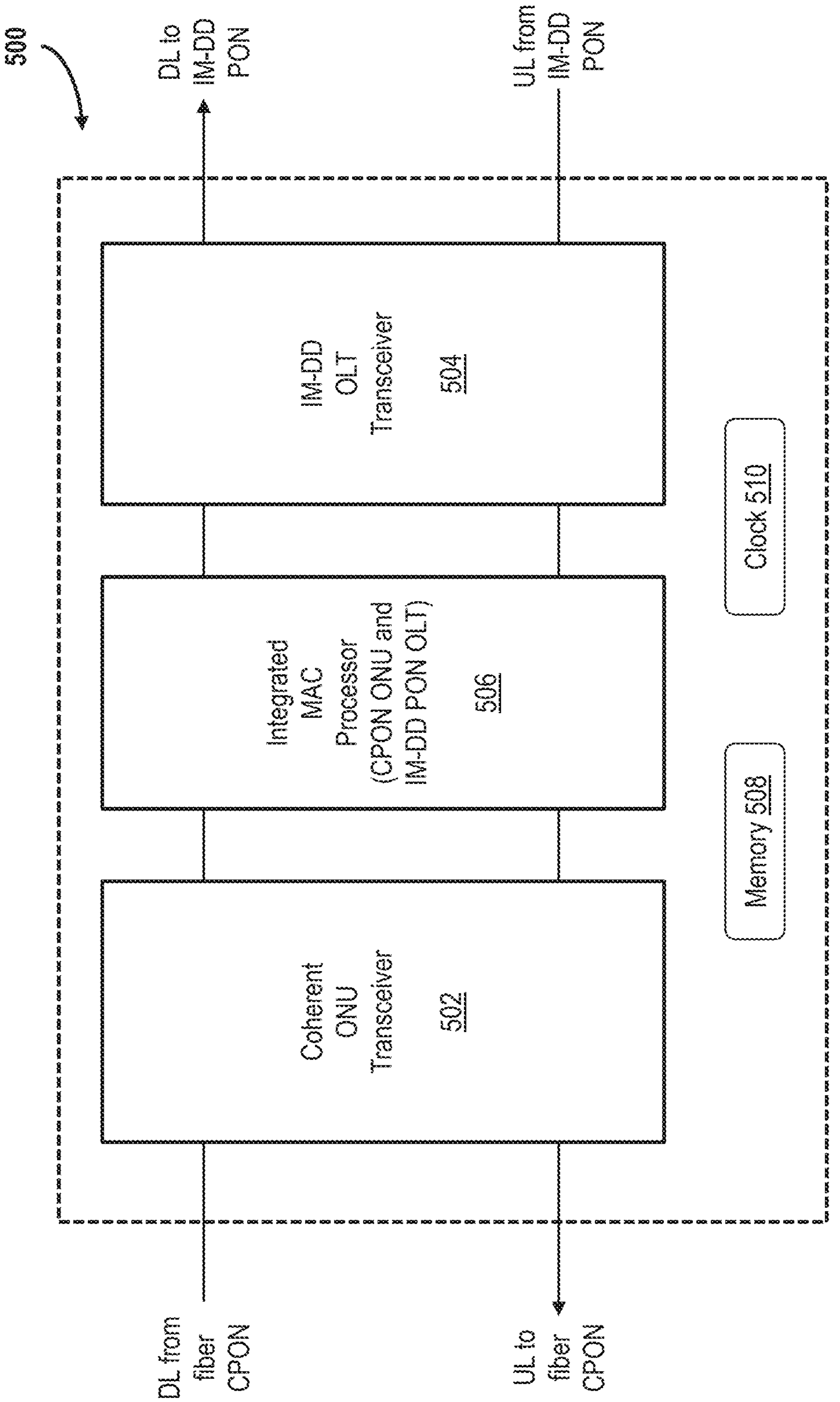
FIG. 5 is a schematic illustration of an exemplary integrated transceiver for an optical network, in accordance with an embodiment.

FIG. 5 is a schematic illustration of an exemplary integrated transceiver 500 for an optical network. In the exemplary embodiment depicted in FIG. 5, integrated transceiver 500 represents a dual-transceiver configuration in a CPON network for intelligent coordinated scheduling with a remote intensity modulation/direct detection (IM-DD) PON (e.g., end users 206(3), FIG. 2). In an embodiment, integrated transceiver 500 includes a coherent ONU transceiver portion 502 and an IM-DD transceiver portion 504, and an integrated MAC processor 506 disposed therebetween. In an exemplary embodiment, integrated transceiver 500 further includes a local memory 508 and a local clock unit 510 accessible to, and shared between, respective transceiver portions 502, 504.

In exemplary operation of integrated transceiver 500, packet traffic arrives from the CPON OLT (e.g., CPON OLT 608, described further below with respect to FIG. 6) on the receiver portion (not separately shown) of coherent ONU transceiver portion 502. The MAC layer of MAC processor 506 then integrates the respective MAC functionality of both of coherent ONU transceiver portion 502 (e.g., from the CPON) and IM-DD OLT transceiver portion 504 (e.g., from the lower-speed IM-DD PON). Through the intelligent integration of both transceiver portions 502, 504 for the respective CPON and IM-DD PON, integrated transceiver 500 advantageously enables functionality as a single PON, thereby significantly reducing the request/grant and polling cycle from the different PON systems.

In further exemplary operation of integrated transceiver 500, integrated MAC processor 506 advantageously functions as a key traffic scheduler to bridge together the CPON and the IM-DD PON. In the downstream direction, this unique dual-transceiver configuration enables the CPON payload to be encoded, modulated, and transmitted to the IM-DD PON optical node distribution system according to an intelligently-scheduled operation, that is, received by an IM-DD ONU (e.g., IM-DD ONU 604, FIG. 6, below), or multiple IM-DD ONUs, since IM-DD OLT transceiver portion 506 may be configured to support multiple IM-DD ONUs.

More particularly, similar to the RPD and RMD embodiments described above, both of transceiver portions 502, 504 intelligently share knowledge with each other through the shared local memory 508 and shared clock unit 510, as well as the operation of integrated MAC processor 506 for optimization of traffic scheduling between the different PON systems. Integrated MAC processor 506 thus serves as the "brain in the middle," able to "see" the scheduling needs of the traffic from both respective PON systems, and then optimize the traffic in an intelligent manner by leveraging the high-bandwidth capacity of the CPON. In this manner, integrated transceiver 500 effectively enables centralized scheduling of the IM-DD PON traffic at the headend, instead of at each remote IM-DD OLT, as is conventionally required. Thus, whereas conventional systems required space two separate schedulers, integrated transceiver 500 effectively implements a single scheduler, thereby significantly reducing collisions, delays, and other scheduling conflicts that frequently arise from the implementation of two different schedulers for the CPON and IM-DD PON, respectively.

An integrated transceiver according to the present configuration therefore realizes still further advantages in relation to conventional dynamic bandwidth allocation (DBA) MAC designs, which require the respective OLTs to grant an upstream bandwidth to each remote ONU in a reactive way, i.e., based on active monitoring of the upstream traffic and the buffer status report (BSR) of each ONU. In contrast, the intelligent coordination functionality of integrated transceiver 500 enables the efficient scheduling of traffic between the different PON systems in a proactive manner.

For example, in the upstream direction, IM-DD traffic may be scheduled to the CPON in the same optimized manner as the downstream traffic to the IM-DD PON, but through the opposite signal path in comparison with the downstream CPON traffic. The upstream IM-DD PON traffic may still be effectively scheduled in a proactive manner according to the centralized scheme, e.g., at the headend, instead of the conventional reactive scheduling required by conventional distributed architecture topologies that require separate schedulers for each different type of PON.

In alternative operation, integrated transceiver 500 may utilize, within integrated MAC processor 506, a pre-determined, or fixed, bandwidth allocation scheme for the CPON side, and conventional DBA scheme for the IM-DD PON. According to this alternative approach, no additional modification to the DBA of the IM-DD PON is needed. For example, when arriving at CPON ONU transceiver portion 502, the data flow from different IM-DD PONs may simply wait (e.g., in local memory 508) for the next available pre-determined or fixed time slot to be sent to the CPON OLT through the coherent link thereof. According to this alternative approach, the impact from the CPON DBA to the IM-DD PON DBA is significantly minimized. In some embodiments, implementation of this alternative approach may further consider the trade-off between the impact from the CPON DBA in relation to desired efficiency of the CPON bandwidth utilization.

According to this alternative operation or approach, in the case of a low-latency service, higher priority may be assigned to bandwidth that is determined to be not shared, and without requiring conventional request-grant processing. Through implementation of this alternative mechanism, an even greater balance between latency and bandwidth use efficiency may be achieved within the context of the significantly greater capacity provided by CPON, which is now effectively and intelligently integrated with the IM-DD PON allocation. Conventional techniques that do not intelligently integrate the different PONs are unable to leverage this CPON capacity for the IM-DD PON paradigm.

Figure 6:
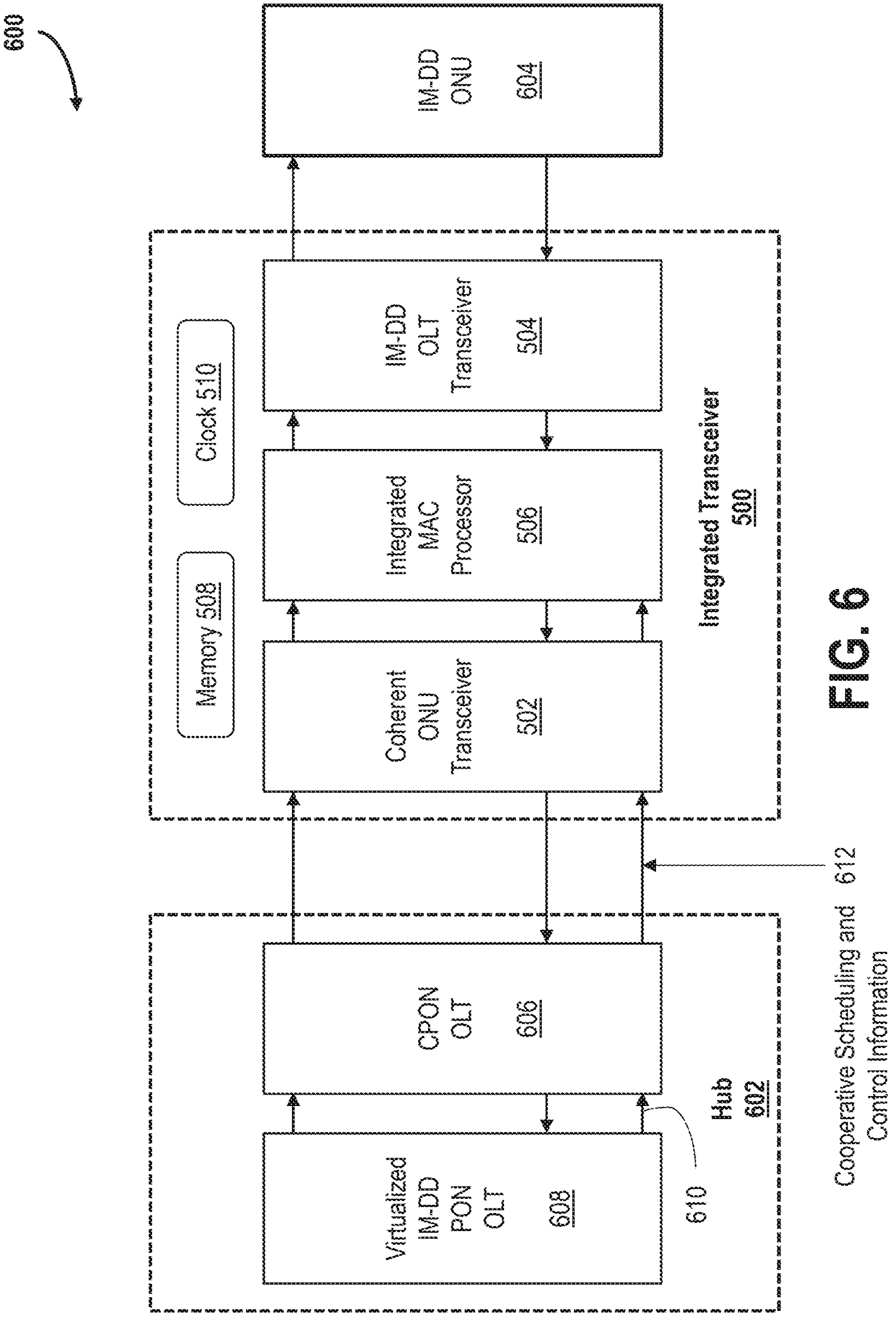
FIG. 6 is a schematic illustration of an exemplary optical network architecture implementing the integrated transceiver depicted in FIG. 5.

FIG. 6 is a schematic illustration of an exemplary optical network architecture 600 implementing integrated transceiver 500, FIG. 5. In an exemplary embodiment, architecture 600 disposes integrated transceiver 500 between a coherent optical hub 602 and an IM-DD ONU 604. In the example depicted in FIG. 6, coherent optical hub 602 is configured for a CPON system, and includes a CPON OLT 606 and a virtualized IM-DD PON OLT 608 to implement cooperative scheduling for the enablement of CPON backhauling, such as in the case of FTTP service to an IM-DD PON (e.g., end users 206(3), FIG. 2).

For ease of explanation, a single IM-DD ONU 604 and a single virtualized IM-DD PON OLT 608 are depicted in FIG. 6. The person of ordinary skill in the art will understand that this depiction is by way of example, and is not intended to be limiting. As described above, IM-DD OLT transceiver portion 504 may be configured to support multiple IM-DD ONUs 604. Similarly, virtualized IM-DD PON OLT 608 may represent a plurality of multiple virtual IM-DD PONs.

In exemplary operation of architecture 600, integrated transceiver 500 functions according to at least one of the alternative operational embodiments described above with respect to FIG. 5, and virtualized IM-DD PON OLT 608 is configured to translate its cooperative scheduling information, as well as other control messages, to CPON OLT 606, by way of a dedicated control channel 610, as cooperative scheduling and control information 612 (e.g., information and/or messages relating to operation, administration, management, and synchronization). According to this innovative configuration of architecture 600, cooperative scheduling and control information 612 may be effectively exchanged between virtualized IM-DD PON OLT 608 and coherent ONU transceiver portion 502.

According to the advantageous configuration of architecture 600, the CPON effectively functions as a transparent network, or "pipe," for the IM-DD PON (e.g., IM-DD ONUs 604). Nevertheless, this innovative configuration of architecture 600 should not be confused with mere tunneling; as described above, the present embodiments advantageously leverage the shared knowledge of transport between the two different PON systems to enable new capabilities for CPON backhauling.

In some embodiments, much of the control functionality of the MAC layer may be remotely processed at coherent hub 102, for example, through network functioning virtualization (NFV). Accordingly, any required messages may then be relayed, as needed, from the coherent ONU transceiver portion 502 (i.e., as the CPON ONU) to IM-DD OLT transceiver portion 504. As described above with respect to FIG. 5, two separate schedulers are not needed for the two different PON systems. Integrated MAC processor 506 is advantageously enabled to utilize cooperative scheduling and control information 612 from the "bigger brain" of CPON OLT 606, which is now transparent to the "smaller brain" of integrated MAC processor 506.

Therefore, according to the exemplary configuration and operation of architecture 600, a cooperative scheduling solution is provided to seamlessly coordinate the timing and DBA of the CPON with the IM-DD PON, thereby enabling the higher bandwidth CPON to become a transparent medium to realize backhaul and efficient dataflow between the virtual IM-DD OLT and remote IM-DD ONUs. In comparison with conventional PON systems, the present systems and methods realize additional advantages, such as the capability for expansion to build developing and future converged networks, for example, utilizing virtual CMTS and/or virtual DU.

According to the present embodiments, by implementing integrated transceiver 500 within the intelligent and coordinated operation of architecture 600, integrated transceiver

500 effectively serves as an extension of both PON systems. Whereas conventional techniques are limited to transmission distances between 20 and 50 km, systems and methods according to the present embodiments are capable of achieving CPON backhauling for transmission distances of up to 80 km or more.

Additionally, the embodiments described above illustrate an exemplary integration strategy for particular end points (e.g., RPD, RMD, remote OLT, IM-DD PON, etc.). The person of ordinary skill in the art though, after reading and comprehending the present description and accompanying illustrations, will understand how the principles described herein are further applicable to different endpoints, which may employ different respective integration strategies, including without limitation, endpoints or ONUs supporting long term evolution (LTE) x-hauling, DOCSIS, enterprise connectivity, etc. it will be further understood that the embodiments herein are described, by way of example and not in a limiting sense, with respect to single distinct ONU endpoints; one ONU, however, may be configured to support multiple ports within the same ONU device, without departing from the scope herein.

The comparative latency reduction advantages of the present systems and methods are described further below with respect to FIGS. 7 and 8. More particularly, FIG. 7 illustrates a message flow case according to a conventional distributed CPON/IM-DD topology, and FIG. 8 illustrates a message flow case utilizing the integrated dual-PON systems and methods described above.

Figure 7:
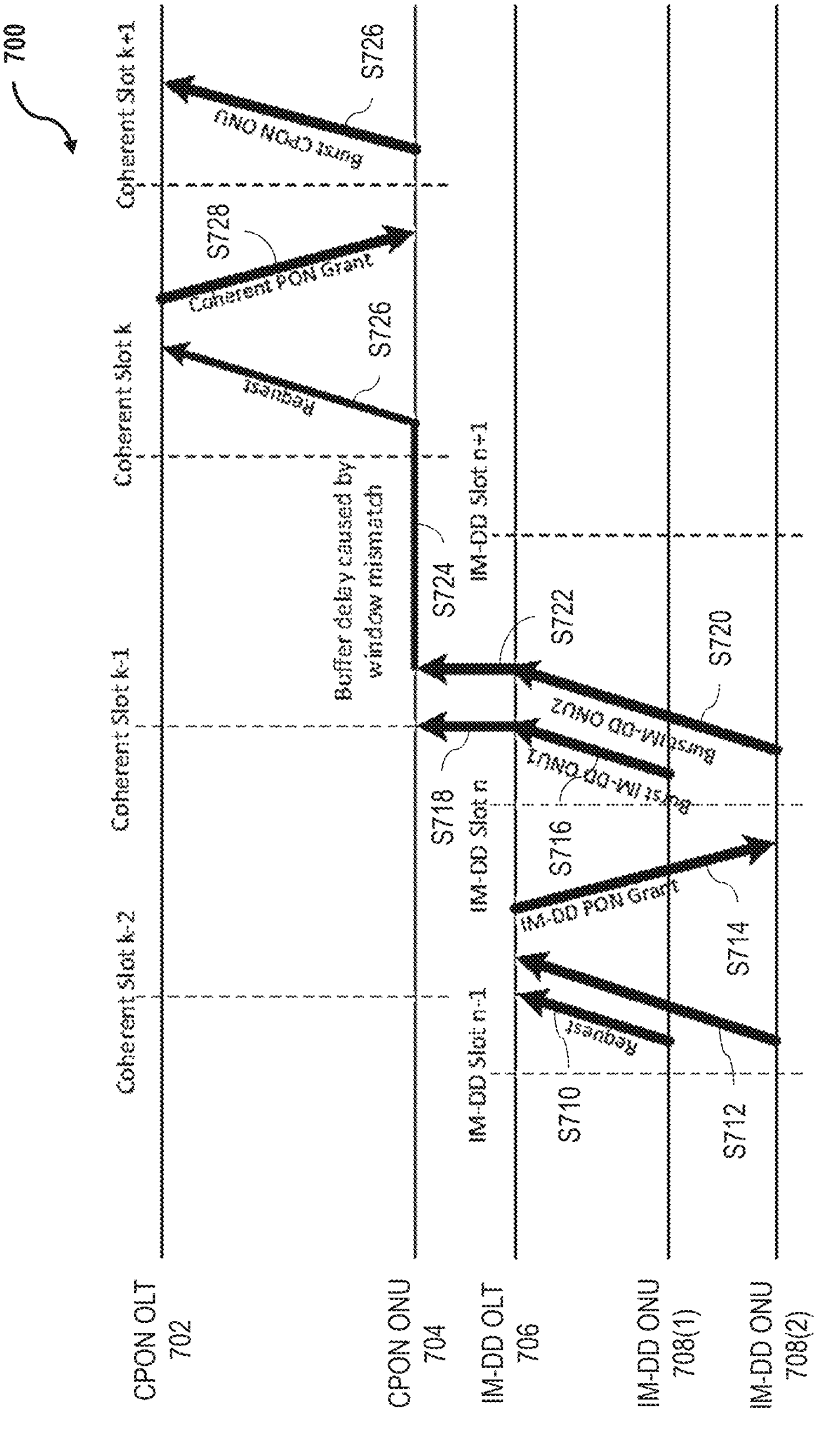
FIG. 7 (Prior Art)
FIG. 7 is message flow sequence diagram according to a conventional backhauling process.
Figure 8:
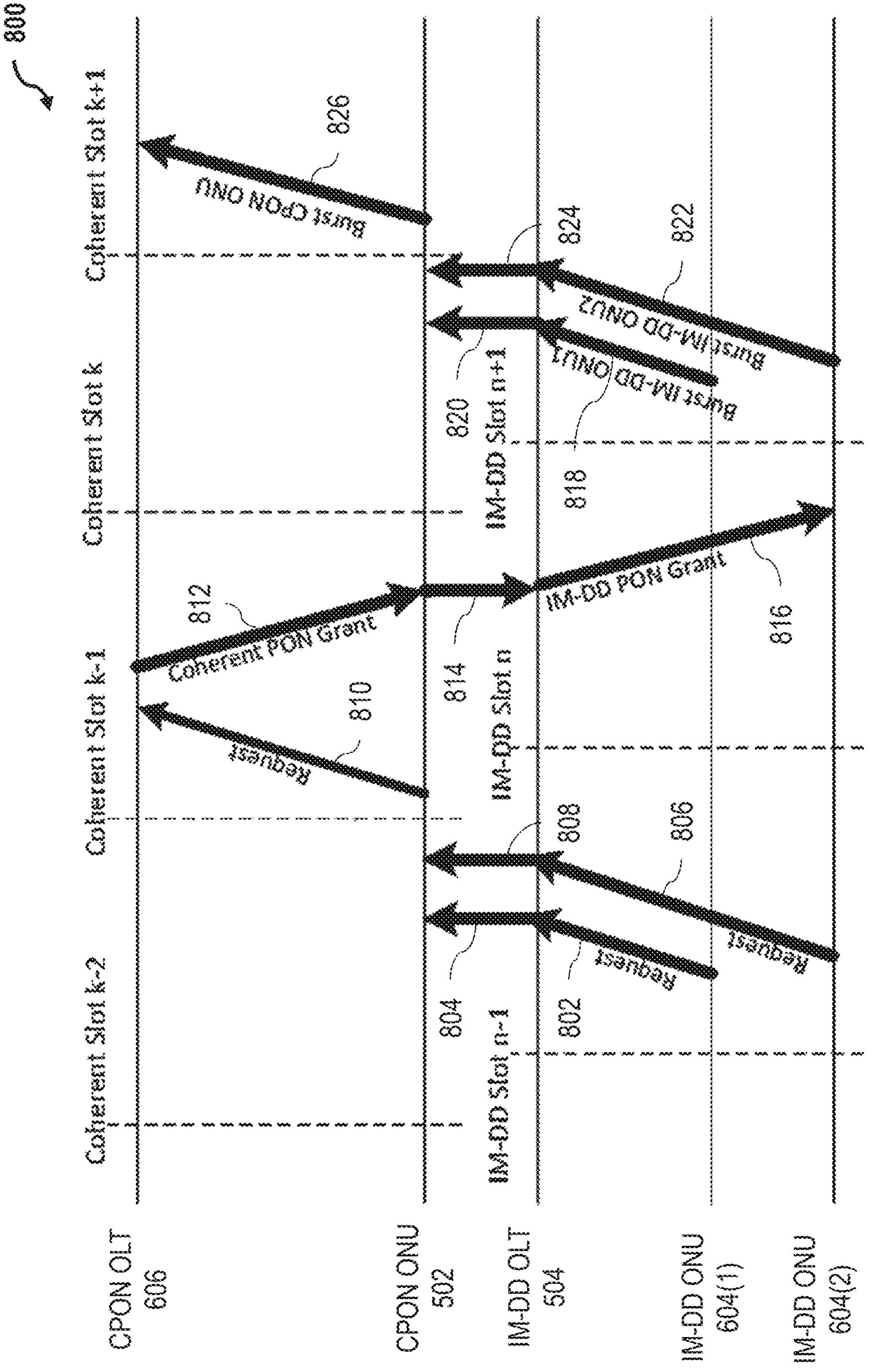
FIG. 8 is message flow sequence diagram according to an exemplary backhauling process for the optical network architecture depicted in FIG. 6.

FIG. 7 is message flow sequence diagram according to a conventional backhauling process 700. In the example depicted in FIG. 7, process 700 is implemented with respect to a conventional (i.e., non-integrated) CPON OLT 702, a conventional CPON ONU 704, a conventional remote IM-DD OLT 706, a first remote IM-DD ONU 708(1), and a second remote IM-DD ONU 708(2). According to this conventional configuration, CPON ONU 704 and remote IM-DD 706 are separate and distinct components, require separate schedulers, and do not share a common integrated MAC processor.

Process 700 begins at step S710, in which first remote IM-DD ONU 708(1) sends a grant request to IM-DD OLT 706. In step S712, second remote IM-DD ONU 708(2) sends a grant request to IM-DD OLT 706. In step S714, IM-DD OLT 706 provides an IM-DD PON grant to second remote IM-DD ONU 708(2). In step S716, first remote IM-DD ONU 708(1) sends an IM-DD burst to IM-DD OLT 706, which, in step S718, is received by CPON ONU 704. In step S720, second remote IM-DD ONU 708(2) sends an IM-DD burst to IM-DD OLT 706, which, in step S722, is also received by CPON ONU 704.

In step S724, CPON ONU 704 experiences a buffer delay caused by a window mismatch between respective IM-DD timing slots ni and coherent timing slots kj. In step S726, CPON ONU 704 forwards the request to CPON OLT 702, and in step S728, CPON OLT 702 provides a CPON grant to CPON ONU 704. In step S730, CPON ONU 704 sends a CPON burst to CPON OLT 702. As can be seen from the message flow sequence of process 700, when the CPON and IM-DD PON are not well coordinated, as in the conventional scheme, window mismatches result, thereby creating extra delays for the flow of information transferred between the CPON and the IM-DD PON, which is particularly unsuitable for services requiring low-latency.

FIG. 8 is message flow sequence diagram according to an exemplary backhauling process 800 for optical network architecture 600, FIG. 6. More specifically, backhauling process 800 illustrates the improved timing results achieved according to the present systems and methods for a similar case of near-simultaneous grant requests from multiple IM-DD ONUs. In the exemplary embodiment depicted in FIG. 8, backhauling process 800 is depicted as being implemented with respect to several elements of architecture 600, including CPON OLT 606, coherent ONU transceiver 502 (e.g., CPON ONU), IM-DD OLT transceiver portion 504 (e.g., IM-DD OLT), and first and second respective IM-DD ONUs 604(1), 604(2).

Process 800 begins at step 802, in which first IM-DD ONU 604(1) sends a grant request to IM-DD OLT 504, which is then, in step 804, immediately forwarded to CPON ONU 502 (i.e., through integrated MAC processor 506, FIGS. 5-6). In step 806, second IM-DD ONU 604(2) sends a grant request to IM-DD OLT 504, which is then, in step 808, similarly also immediately forwarded to CPON ONU 502. In step 810, CPON ONU 502 forwards grant request to CPON OLT 606. In step 812, CPON OLT 606 provides a CPON grant to CPON ONU 502, which is then, in step 814, immediately forwarded to IM-DD OLT 504 (i.e., also through integrated MAC processor 506).

In step 816, IM-DD OLT 504 provides an IM-DD PON grant to second IM-DD ONU 604(2). In contrast to process 700, FIG. 7, the message flow sequence depicted in FIG. 8 illustrates that the CPON grant is provided relative to the initial ONU grant request, after the request is transferred from IM-DD OLT to the CPON ONU, and prior to the IM-DD PON grant, which occurs immediately after receipt of the CPON grant.

In step 818, first IM-DD ONU 604(1) sends an IM-DD burst to IM-DD OLT 504, which, in step 820 is immediately received by CPON ONU 502. In step 822, second IM-DD ONU 604(2) also sends an IM-DD burst to IM-DD OLT to, which, in step 824, is also immediately received by CPON ONU 502. In step 826, CPON ONU 502 sends a CPON burst to CPON OLT 606. As can be further seen from the message flow sequence of backhauling process 800, the respective IM-DD bursts from first and second ONUs 604(1), 604(2) occur after both the CPON grant in the IM-DD PON grant have occurred. In contrast, the conventional message flow sequence of conventional process 700, FIG. 7, shows that the IM-DD bursts from the remote IM-DD ONUs occur before the CPON grant, thus giving rise to significant buffer delays.

Accordingly, when an integrated MAC layer (e.g., integrated MAC processor 506) is applied between the present dual-transceiver configuration, intermediate message exchanges from the IM-DD OLT to the CPON ONU, which give rise to buffer delays, may be avoided. Instead, the present systems and methods enable pre-allocation of the CPON request-grant time window, such that the timing gaps created by such buffer delays (e.g., step S724, FIG. 7) are advantageously minimized.

The person of ordinary skill the art will further understand that the term "near-simultaneous" is used with respect to some steps of the respective processes 700, 800 to indicate that some processing delay is expected with regard to the transfer or exchange of data between various architectural components. Nevertheless, according to the present techniques, the data flow is effectively transferred between the CPON and the IM-DD PON in a seamless manner, as if the two different PONs were operating as a single PON.

Thus, in addition to the latency reduction advantages achieved according to backhauling process 800, implementation of the present techniques further realizes further simplification of the integrated MAC, thus rendering deployment of the present systems and methods within existing PON architectures and topologies even more attractive. In some embodiments, each endpoint terminal device in an optical communication system architecture may be replaced by an integrated ONU according to one of the embodiments described herein. In other embodiments, existing optical communication networks may implement the present integrated MAC techniques with respect to individual services of the network (e.g., remote PHY, remote MAC-PHY, CPON backhauling, etc.) as the particular service is added, or upgraded, in a multiple-service distributed architecture.

The present coherent optics technology solutions may be of further particular utility when leveraged in the cable environment as a means of multi-link aggregation, and/or through direct edge-to-edge connectivity to a desired endpoint, including without limitation, high speed wavelength services, remote PHY, remote MAC-PHY, ex-hauls, backhauls, remote FTTP backhauls, 3GPP 4G/5G/5GNR/6G wireless connectivity services, and/or other rapidly growing commercial services in the cable industry. Such services typically demand very high bandwidths, robustness, and flexibility, to support a diversity of different service tiers or levels. The integrated intelligent solutions described herein are thus of further advantageous utility to the growing service requirements for such market segments.

Exemplary embodiments of systems and methods for integrated ONUs and coherent backhauling in optical communication networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for backhauling traffic from a coherent optical communication network to a non-coherent optical communication network, the method implemented using an integrated transceiver including a coherent optical receiver portion and a non-coherent optical transmitter portion in communication with the coherent optical transmitter portion, the method comprising steps of:

receiving, at the non-coherent optical transmitter portion, a first grant request from a first downstream non-coherent optical transceiving unit;

forwarding the first grant request from the non-coherent optical transmitter portion to the coherent optical receiver portion;

sending, from the coherent optical receiver portion, the first grant request to the coherent optical communication network;

obtaining, at the coherent optical receiver portion from the coherent optical communication network, a grant in response to the sent first grant request;

relaying the obtained grant from the coherent optical receiver portion to the non-coherent optical transmitter portion;

transmitting the obtained grant from the non-coherent optical transmitter portion to the first downstream non-coherent optical transceiving unit; and receiving, at the non-coherent optical transmitter portion, a first optical signal burst from the first downstream non-coherent optical transceiving unit, wherein the step of sending the first grant request is executed prior to the step of receiving the first optical signal burst.

2. The method of claim 1, wherein the coherent optical communication network is a coherent passive optical network (CPON) and the non-coherent optical communication network is an intensity modulation/direct detection (IM-DD) passive optical network (IM-DD PON).

3. The method of claim 2, wherein the non-coherent optical receiver portion includes an IM-DD optical line terminal (OLT) and the coherent optical receiver portion includes a coherent optical network unit (ONU).

4. The method of claim 3, wherein the first downstream non-coherent optical transceiving unit includes an IM-DD ONU, and further comprising a step of receiving, at the non-coherent optical transmitter portion, a second grant request from a second downstream IM-DD ONU prior to the step of sending the first grant request to the coherent optical communication network.

5. A local transceiver for a hybrid coherent optical communication network, comprising:

a coherent first local optical transceiver portion;

a non-coherent second local optical transceiver portion in communication with the coherent first local optical transceiver portion, wherein the non-coherent second local optical transceiver portion is configured to (i) receive a first grant request from a remote non-coherent optical transceiving unit, and (ii) forward the first grant request to the coherent first local optical transceiver portion, and wherein the coherent first local optical transceiving unit is configured to (i) send the first grant request to the coherent optical communication network, (ii) obtain a grant from the coherent optical communication network in response to the sent first grant request, and (iii) relay the obtained grant to the non-coherent second local optical transceiver portion, and wherein the non-coherent second local optical transceiver portion is further configured to (iii) transmit the obtained grant to the remote non-coherent optical transceiving unit, and (iv) receive a first optical signal burst from the remote non-coherent optical transceiving unit after the first grant request is sent from the coherent first local optical transceiver portion.

6. The local transceiver of claim 5, wherein the coherent optical communication network includes a coherent passive optical network (CPON).

7. The local transceiver of claim 5, wherein the remote non-coherent optical transceiving unit is configured to operate within an intensity modulation/direct detection (IM-DD) passive optical network (PON).

8. The local transceiver of claim 5, wherein the non-coherent second local optical transceiver portion includes an IM-DD optical line terminal (OLT), and wherein the coherent first local optical transceiver portion includes a coherent optical network unit (ONU).

9. The local transceiver of claim 5, further comprising a local memory in operable communication with an integrated media access control (MAC) processor configured to centrally schedule traffic between the local transceiver and the remote non-coherent optical transceiving unit.

10. The local transceiver of claim 9, wherein the integrated media access control (MAC) processor is disposed remotely from the local transceiver.

11. The local transceiver of claim 10, wherein the first optical signal burst includes an intensity modulation/direct detection (IM-DD) signal.

12. The local transceiver of claim 11, wherein the local memory is configured to buffer the IM-DD signal.

13. The local transceiver of claim 9, further comprising a local clock unit in operable communication with the integrated MAC processor, the local memory, the coherent first local optical transceiver portion, and the non-coherent second local optical transceiver portion.

14. The local transceiver of claim 5, wherein the hybrid coherent optical communication network includes at least one radio frequency (RF) module.

15. The method of claim 1, wherein the integrated transceiver includes an integrated media access control (MAC) processor configured to manage cooperative scheduling information.

16. The method of claim 15, wherein the integrated MAC processor is further configured to enable traffic from the non-coherent optical communication network to be scheduled from the coherent optical communication network.

17. The method of claim 16, further comprising a step of scheduling data traffic between the coherent and non-coherent optical communication networks during a pre-allocated request-grant time window.

18. The method of claim 17, wherein the pre-allocated request-grant time window is based on scheduling information obtained from a control plane of the integrated transceiver.

19. The method of claim 15, wherein the integrated MAC processor is further configured to implement a pre-determined bandwidth allocation scheme for the coherent optical communication network, and a dynamic bandwidth allocation scheme for the non-coherent optical communication network.

20. The method of claim 19, further comprising a step of assigning a higher priority to bandwidth that is not shared between the coherent optical communication network and the non-coherent optical communication network.

* * * * *